Nov. 5, 1935.   P. J. MARKS   2,020,036

PHOTOGRAPHIC SHUTTER

Original Filed Aug. 26, 1931   7 Sheets-Sheet 1

INVENTOR
Paul J. Marks
BY
his ATTORNEY

Nov. 5, 1935.    P. J. MARKS    2,020,036
PHOTOGRAPHIC SHUTTER
Original Filed Aug. 26, 1931   7 Sheets-Sheet 2

INVENTOR
Paul J. Marks
BY
his ATTORNEY

Nov. 5, 1935.    P. J. MARKS    2,020,036
PHOTOGRAPHIC SHUTTER
Original Filed Aug. 26, 1931    7 Sheets-Sheet 3

INVENTOR
Paul J. Marks
BY
his ATTORNEY

Nov. 5, 1935.     P. J. MARKS     2,020,036
PHOTOGRAPHIC SHUTTER
Original Filed Aug. 26, 1931     7 Sheets-Sheet 4

INVENTOR
Paul J. Marks

Nov. 5, 1935.  P. J. MARKS  2,020,036
PHOTOGRAPHIC SHUTTER
Original Filed Aug. 26, 1931   7 Sheets-Sheet 6

Patented Nov. 5, 1935

2,020,036

UNITED STATES PATENT OFFICE 2,020,036

PHOTOGRAPHIC SHUTTER

Paul J. Marks, Rochester, N. Y.

Application August 26, 1931, Serial No. 559,391
Renewed March 2, 1934

20 Claims. (Cl. 95—63)

My present invention relates to photography and more particularly to photographic shutters, and it has for its object to provide a shutter construction of wide adaptability, the functions of which serve the professional photographer as well as the amateur with a means for setting his shutter preliminarily to obtain the best and most accurate results under any and all conditions of light, distance and physical phase of the object, that is, as to the latter, whether it is in a condition of rest or motion. In its broader aspects, the invention provides a means whereby a photographer, having in view these conditions, may, with the manipulation of a single controlling element, coordinate the time length of the exposure with the volume of light admitted through the lens on a particular exposure and with a particular object in or out of motion to produce the best results in the finished picture. The invention contemplates, to obtain its best results, the employment of a pivoted blade symmetrically opening primary shutter in connection with a symmetrically opening pivoted blade or iris diaphragm. The improvements are directed in part to the construction and operation of the diaphragm itself; to the construction and operation of the blade mechanism itself; to the construction and operation of a particularly adaptable retarding mechanism for timing the shutter blades; and to the provision of a common controlling means for coordinating the efforts of these separate instrumentalities, while at the same time effectively controlling the functions of any one of them.

To these and other ends, the invention resides in certain improvements and combinations of parts, all as will be hereinafter more fully described, the novel features being pointed out in the claims at the end of the specification.

In the drawings.

Similar reference numerals throughout the several views indicate the same parts.

To first give a general idea of the full scope of the improvements in photographic shutters that I have attained, I will say that in the illustrated embodiment of my invention I have shown it in connection with an automatic shutter, in which the cycles of operation are effected through a single operating element as distinguished from a "set" shutter in which the cycle of operation is effected through a setting element and a releasing element, the first consummating the arrangement of the shutter parts for action and the latter being adapted to place them in action, as will be understood by those skilled in the art to which this invention appertains, but it will develop in the following explanation and description that most of the features of the invention can be utilized in either a "set" shutter or an "automatic" shutter.

Heretofore, shutters of the type herein involved have been made with diaphragms controlling the admission of light to the lens, as to marginal rays, and restricting the lens to the transmission of axial rays that depicted upon a suitable scale visible to the operator a very general idea of the light conditions under which the diaphragm should be enlarged or retracted. Under published instructions or empirically through his own experience, both the professional and amateur photographer would adjust the speed of the shutter upon an entirely different scale or indicating device, so as to give the best result as between the interval of opening and closing the shutter blades and the diaphragm adjustment controlling the volume of light admission in general.

In the practice of my invention, I contemplate a joint and simultaneous control of the diaphragm opening, by which the central and marginal rays of light in their aggregate volume are increased or reduced to agree with the timing of the opening and closing movements of the shutter blades, so that the time during which light is admitted to the sensitive element will be properly correlated with the volume of light admission in general for which the diaphragm controls provide.

In other words, what I accomplish in the embodiment shown is this: The operator analyzes his light conditions and the state of his object to be photographed, that is, a still object, a slowly moving object or a rapidly moving object. A single setting device is placed at his disposal whereby an adjustment thereof based upon said light conditions and the state of the object automatically arranges a period of exposure as effected by the shutter blades that will agree therewith to produce the best possible result in connection with the forming of a diaphragm opening affording the proper volume of light. This arrangement is to be distinguished from the effects obtained by merely adjusting the shutter speed and the diaphragm opening at the same time, because with my device the diaphragm may stay in a position to admit the same volume of light under purely light conditions, whereas the shutter may operate at any one of a number of speeds according to whether the object is still or is in motion.

More in detail, I provide in the illustrated embodiment a single setting dial. This dial is divided into sectors having designations, that, for practical purposes, comprise "Average View", "Near View—Portrait", "Moving Object", "Marine—Clouds—Snow" and "Distant View". Repeated sub-divisions under these in each case indicate light conditions running down the scale of "Bright", "Clear", "Dull", "Gray", et cetera. The diaphragm adjustment is based upon these. Still further sub-divisions on the dial appropriately connected with these light condition sub-divisions provide for each such sub-division blade opening timings running from a full second down to a hundredth of a second, the latter constituting an "instantaneous" exposure under the light conditions of the group. The said dial is connected to simultaneously or concomitantly control the setting of the diaphragm for a particular light condition, a particular object position and a particular object condition and the shutter speed appropriate thereto. To effect this, the single dial sets the diaphragm opening and the extent of participation of a retarding device that in turn times the opening of the shutter blades. Time and bulb exposures are also provided for in each group.

Referring more particularly to the drawings and first to Figs. 1 to 4 thereof, I house my mechanism entirely within the annular chamber 1 provided by a cylindrical casing 2 having a central forwardly projecting collar 3 defining the exposure or lens opening. This collar 3 is threaded to receive the lens tube (not shown) as is usual in this type of shutter. The front of the chamber 1 is closed by the setting dial 4 that may be rotated repeatedly counter-clockwise on the collar 3 as a center, over which collar it fits. It is also provided with a knurled peripheral flange 5 projecting rearwardly and engaging over the rim of the casing 2 by which it is turned. In the present embodiment, said setting dial cannot be turned in a clockwise direction for reasons that will be explained later in connection with a more intimate description of the dial itself and its functions.

To secure it in rotatable position upon the collar 3 in a manner permitting its removal and replacement in a simple way, the dial 4 is secured by screws 6 to an underlying cover plate 7, with respect to which it has a spaced relationship, although said cover plate is inset within the flange 5 thereof. The casing collar 3 has a plurality of locking openings 8 therein to take a corresponding plurality of inwardly projecting locking shoulders 9 on a contracting split spring ring 10 that embraces the collar between the dial 4 and the cover plate 7. When in operative position, as in Figs. 2 and 3, this spring ring holds the cover plate 7 against the casing covering chamber 1 and similarly holds the dial 4 to the cover plate and casing when the screws 6 are in place. By removing the latter and lifting off the dial, the ring 10 becomes accessible and upon expanding and dislodging it in turn, the cover plate 7 may be removed and the annular chamber 1 uncovered for access to the various shutter mechanisms hereinafter described. The blade mechanism lies at the bottom or rear of the annular chamber 1 and it is, therefore, convenient to describe it first.

Figures 1, 2, 3:
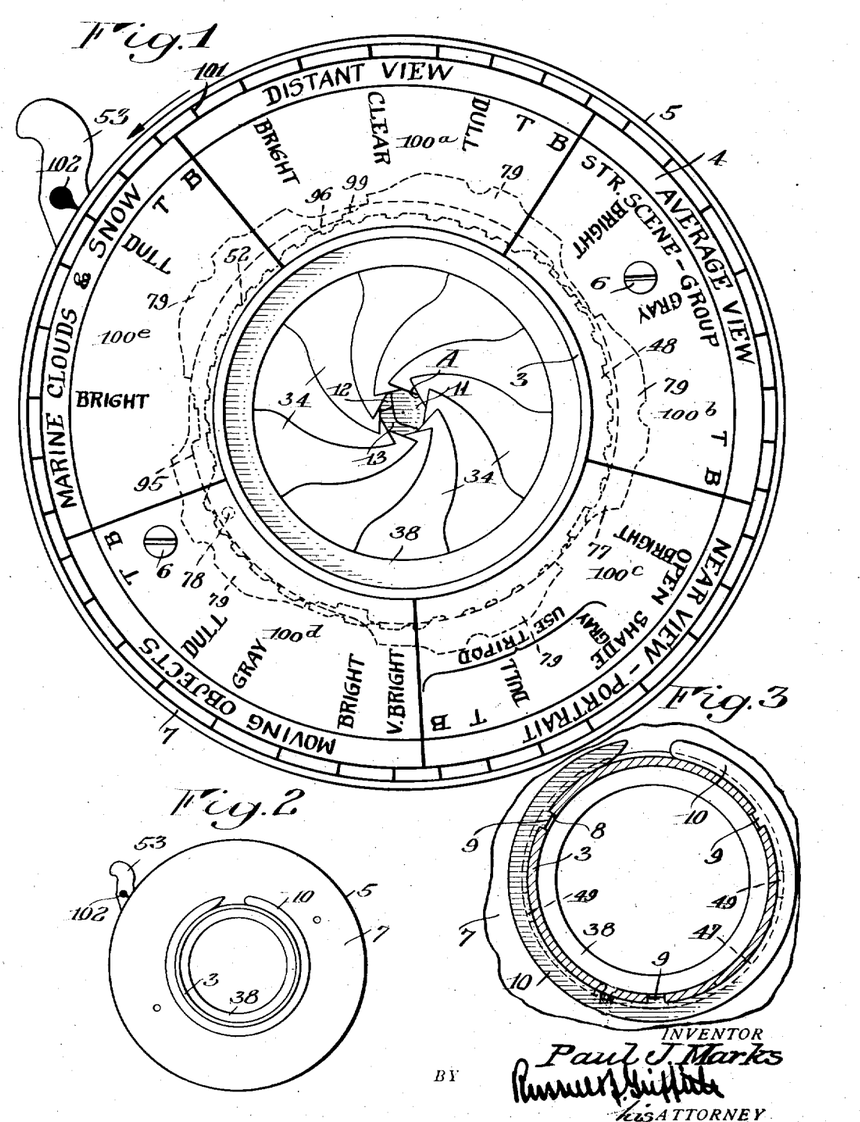
Fig. 1 is a front elevation of a photographic shutter constructed in accordance with and illustrating one embodiment of my invention.
Fig. 2 is a reduced elevation of the front of the shutter with the adjusting dial shown in Fig. 1 removed.
Fig. 3 is a fragmentary view on a scale between that of Figs. 1 and 2 of the face of the shutter in vertical section through the lens tube to show the manner in which the securing ring of Fig. 2 engages.
Figure 4:
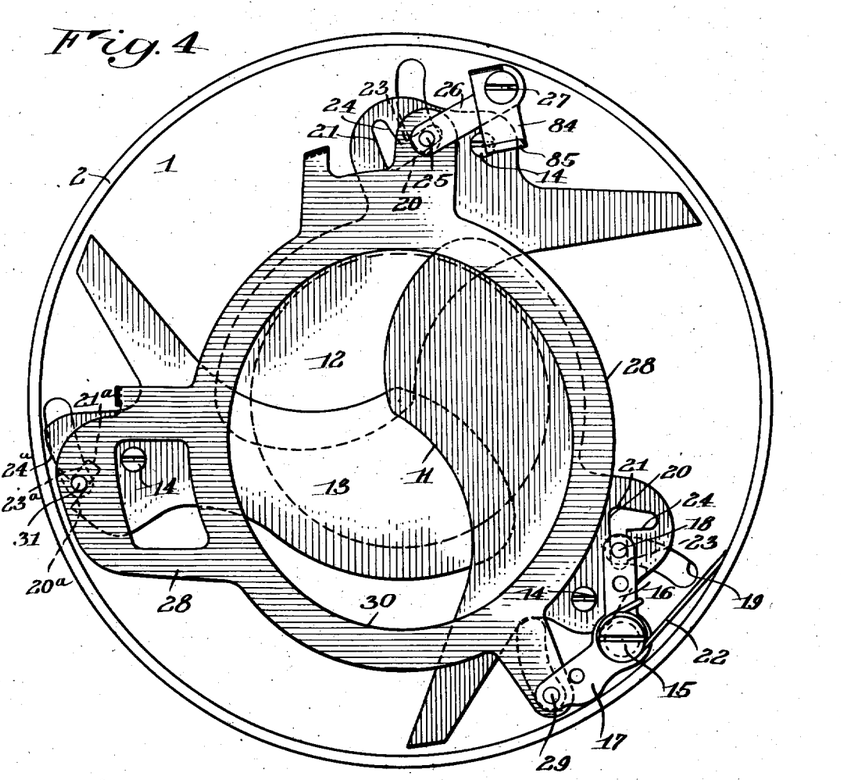
Fig. 4 is a front view on the scale of Fig. 1 of the bottom of the shutter casing, showing the shutter blades in closed position with all of the overlying parts removed.
Figure 5:
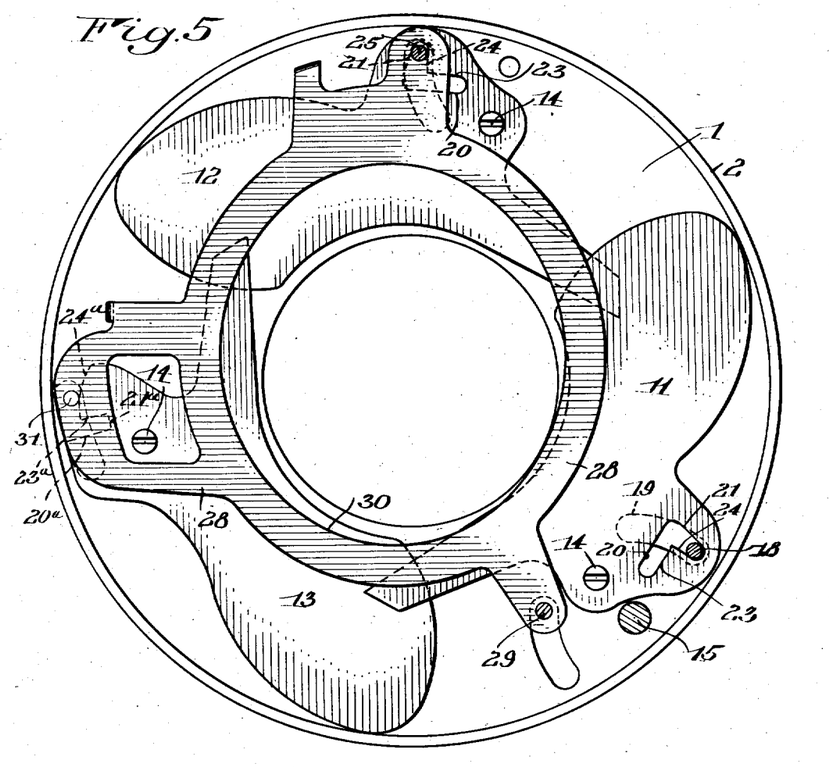
Fig. 5 is a view similar to Fig. 4, except that the blades are shown in open position and certain adjacent parts are shown in vertical section.
Figure 6:
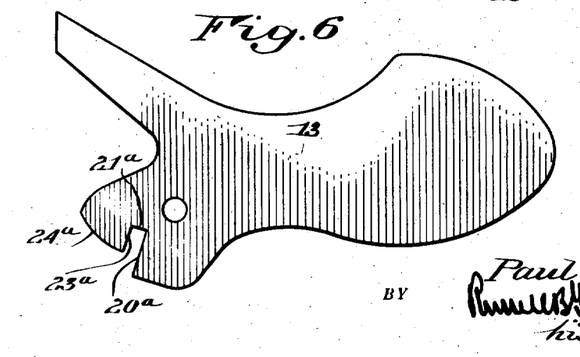
Fig. 6 is a detailed face view of one of the shutter blades, detached.
Figure 7:
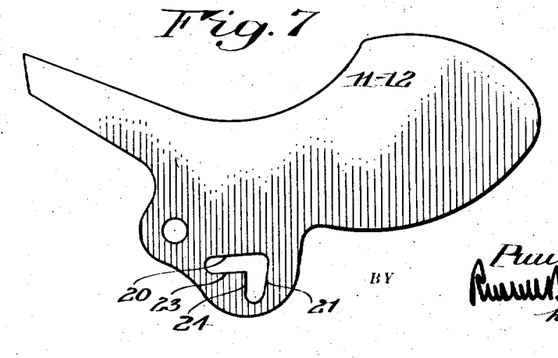
Fig. 7 is a detailed face view of one of the other shutter blades, detached.

Referring more particularly to Figs. 4 to 7 inclusive, I provide, in the present instance, three pivoted symmetrically opening blades 11, 12 and 13. Blades 11 and 12 are duplicates and are shown in detail in Fig. 7, while, for certain reasons, blade 13 is of slightly different form and is shown in detail in Fig. 6. They all turn on fixed pivots fastened in the bottom of the casing, as indicated at 14. The blade actuator is pivoted in the casing on a stud 15 and comprises, so far as these views and this particular description are concerned, two bell crank arms 16 and 17. Arm 16 has a downwardly projecting pin 18 thereon which, for clearance only, travels in an arcuate slot 19 in the bottom of the shutter casing. As shown in Fig. 4, when the shutter blades are closed, pin 18 engages a wall 20 of an L-shaped slot 21 in shutter blade 11, whereby it holds the blade closed by the tension of a spring 22 acting on arm 16 and coiled about pivot 15 of the actuator. When the latter is rocked in the manner hereinafter described against the tension of the spring, pin 18 rides along the opposite wall 23 of the slot and opens the blade. When it has so opened it, it rounds the corner of the slot and rides upon an arcuate surface 24 thereof, still holding the blade open but not effecting its movement, so that the lever 16 can perform an idle movement. Upon the return of lever 16, pin 18 again traverses the surface 24, initially, still holding the blade open until it snaps against surface 20, instantly closing the blade under the influence of spring 22 and reassuming the position of Fig. 4 from that of Fig. 5. It will thus be seen that blade 11 opens instantly and closes instantly. The automatic timing of the duration of the exposure is effected by retarding mechanism acting against actuator 16 during the period that it is coming and going along surface 24.

Blade 12 is operated in exactly the same manner, so far as the mechanical movement is concerned, being provided with a similar slot 21, in which moves a pin 25 on a lever 26 pivoted on a stud 27. This pin 25 also makes a pivotal connection between arm 26 and a yoke 28, through the medium of which the three blades are simultaneously actuated. For this purpose, arm 17 of the actuator is provided with a wrist pin 29 connecting it to yoke 28. The latter has an elliptical opening 30, so that, as it oscillates on lever arms 17 and 26, which jointly hold it to a definite movement being connected on the same radii, it will not obscure the exposure or lens opening.

The third blade 13 is also operated on the same mechanical principle as the other two, except that it is of a little different shape for certain purposes of space conservation within the annular chamber. What corresponds to the L-shaped slot 21 is indicated at 21ª, but though it is an open slot instead of a closed one it furnishes similarly acting blade opening and closing surfaces 23ª and 20ª, respectively, with a dwelling surface 24ª traversed by a pin 31 on an extension of yoke 28. The oscillation of the latter having been fully explained, the path and function of the pin will be understood by comparing Figs. 4 and 5.

The blade mechanism just described occupies the bottom or rear of the annular casing. As usual in this type of shutter, it is confined beneath a partition member 32 which is an annulus secured in spaced relationship to the bottom of the casing by screws 33. The diaphragm mechanism is carried on this partition adjacent to the blade mechanism and will now be described.

Figure 12:
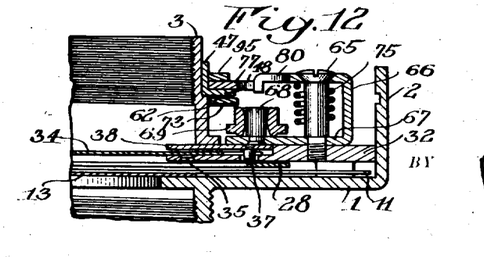
Fig. 12 is a fragmentary detailed section taken on the line 12—12 of Fig. 8.
Figure 16:
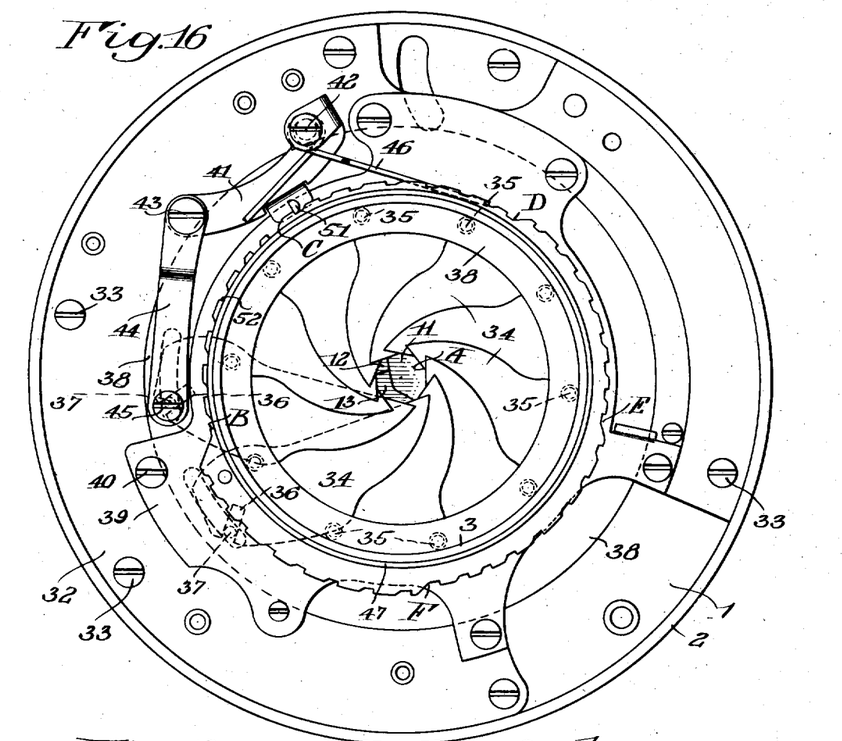
Fig. 16 is a front view of the shutter case, showing the diaphragm mechanism in elevation with all overlying mechanism removed.
Figure 17:
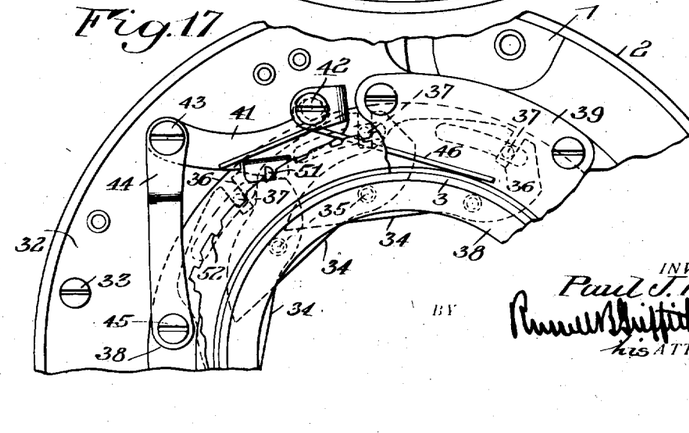
Fig. 17 is a fragmentary view of the diaphragm actuating mechanism, shown in Fig. 16, in the position it occupies when the diaphragm is open as against the showing of Fig. 16, in which the diaphragm is closed to produce a smaller aperture.

Referring more particularly to Figs. 12, 16 and 17, such diaphragm, in the present embodiment, is of the symmetrically opening or iris type embodying a plurality of blades 34 having fixed pivots 35 and slots 36 in which slidably ride actuating pins 37 on the usual rotary diaphragm ring 38, that is, it has a limited or partial rotation in one direction and return in the other direction to open and close or rather expand or retract the light opening A in a manner well known to those skilled in the art. The said actuating ring 38 has a bearing between the partition annulus 32 and a cover plate 39 secured to the annulus by screws 40, as shown in Fig. 12. Such motion is imparted to the ring by a lever 41 having a fixed pivot 42 on the partition 32 and connected by a wrist pin 43 with a link 44, which latter has in turn a wrist pin connection 45 with the ring 38. It will be seen by an inspection of Fig. 16 that a rocking of the lever 41 to the left, which accomplishment is the tendency of a spring 46 coiled about the fixed pivot 42, will narrow the aperture A by moving said ring 38 to the left and hence pin 37 to the left in slots 36 of the blades 34.

Adjustments of the actuating ring 38 to widen the diaphragm opening A are effected positively against the tension of spring 46 in the following manner which brings us to a description of the joint or concomitant control of the blade mechanism, the diaphragm mechanism and the time and bulb stops, which latter have not been before mentioned but are present in this embodiment of my invention.

Figure 11:
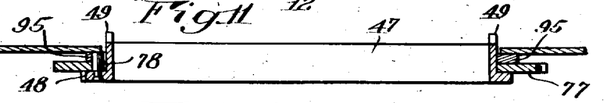
Fig. 11 is a transverse section, showing the controlling cams and their mountings in detail.

Rotatable to the left or counter-clockwise on the central or lens opening collar 3 is a cam ring 47 having on its undermost side a cam track, indicated generally at 48 in Fig. 11 and best shown in plan in Fig. 16. Its upper edge is provided at intervals with projections 49, with which interlock shoulders provided by recesses 50 in the plate 7, which latter, as previously described, is fixed to dial plate 4. It is, therefore, clear that rotation of the dial plate 4 to the left will similarly rotate cam track 48, which latter, in the present instance, is divided into five sectors (Fig. 16) B—C, C—D, D—E, E—F and F—B, each of which in the order named is progressively higher and represents an increased radius of the cam. Riding against the cam track 48 is an actuating pin 51 on lever 41 and when rotated to the left this pin rides up on the cam sectors and opens the diaphragm to varying degrees by exerting a pull on link 44 and hence on the diaphragm actuating ring.

It will be noted that the cam track 48 does not present a regular surface to the pin 51 but, on the other hand, even each sector presents interspersed notches 52. It will further be observed that the diaphragm actuating pin 51 presents a rounded surface to the cam on one side and a square shoulder on the other. Thus when the dial and cam are turned to the left, pin 51 will ride over the cam, but if it is attempted to turn them to the right, the pin 51 will lock with the shoulders 52. In this way, the diaphragm actuating mechanism as a whole also acts as a ratchet and pawl, preventing retrograde adjusting movement which would be injurious to the associated mechanisms.

As will hereinafter shortly appear, there are associated with cam 48 coordinate cams that control the speed of the shutter blades and the adjustments for time and bulb exposures.

Coming now to the blade operating mechanism, the shutter illustrated is of the "automatic" type as distinguished from the "set" type and is, therefore, provided with the usual single operating lever 53 projecting through a slot in the lateral wall of the shutter case. It has a limited rocking movement between the normal position of Fig. 13 and the extreme position of Fig. 9 on a fixed pivot 54, about which is coiled a spring 55 that has one end hooked in one or more notches 56 provided in the inner arm of the lever so that its tension may be adjusted and having the other end reacting against the case.

The master member 57 is pivoted at 58 and coiled about its pivot is the main shutter actuating spring 59. Its setting arm 60 is the usual downwardly yielding spring arm engaged by a shoulder 61 on the operating lever, the action being the familiar one in which on depression of operating lever 53, shoulder 61 engages arm 60 and rocks the master member to set position, eventually slipping off, as in Fig. 9, and allowing the master member to return by spring 59, after which shoulder 61 rides over arm 60, depressing it as spring 55 returns the operating lever and reengaging shoulder 61 for the next operation.

Figure 8:
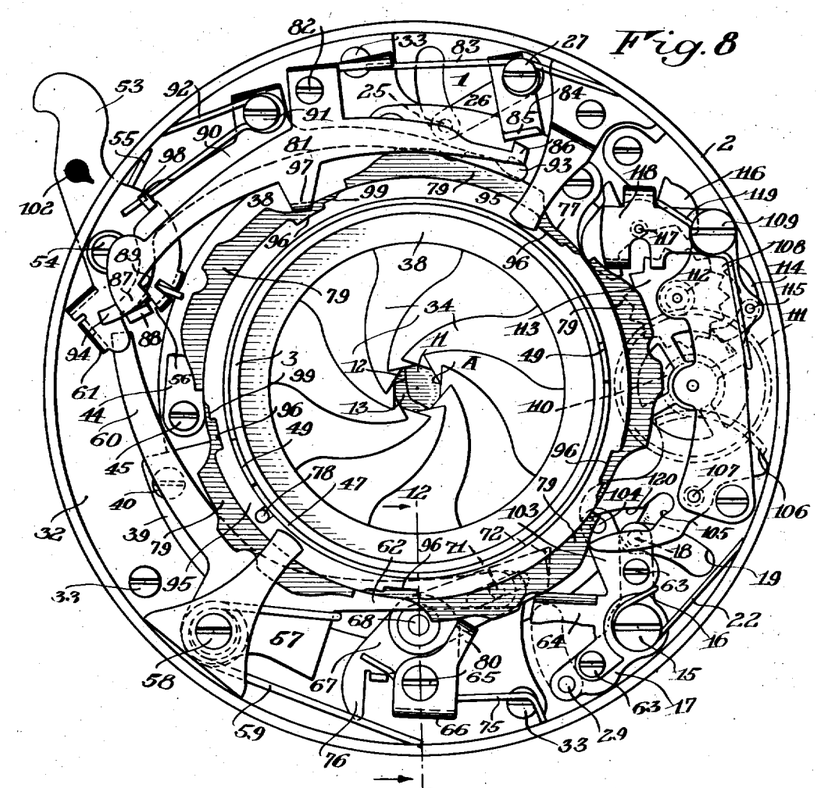
Fig. 8 is a face view of the actuating mechanism and controlling mechanism set for time exposure with the shutter blades closed.
Figures 9, 10:
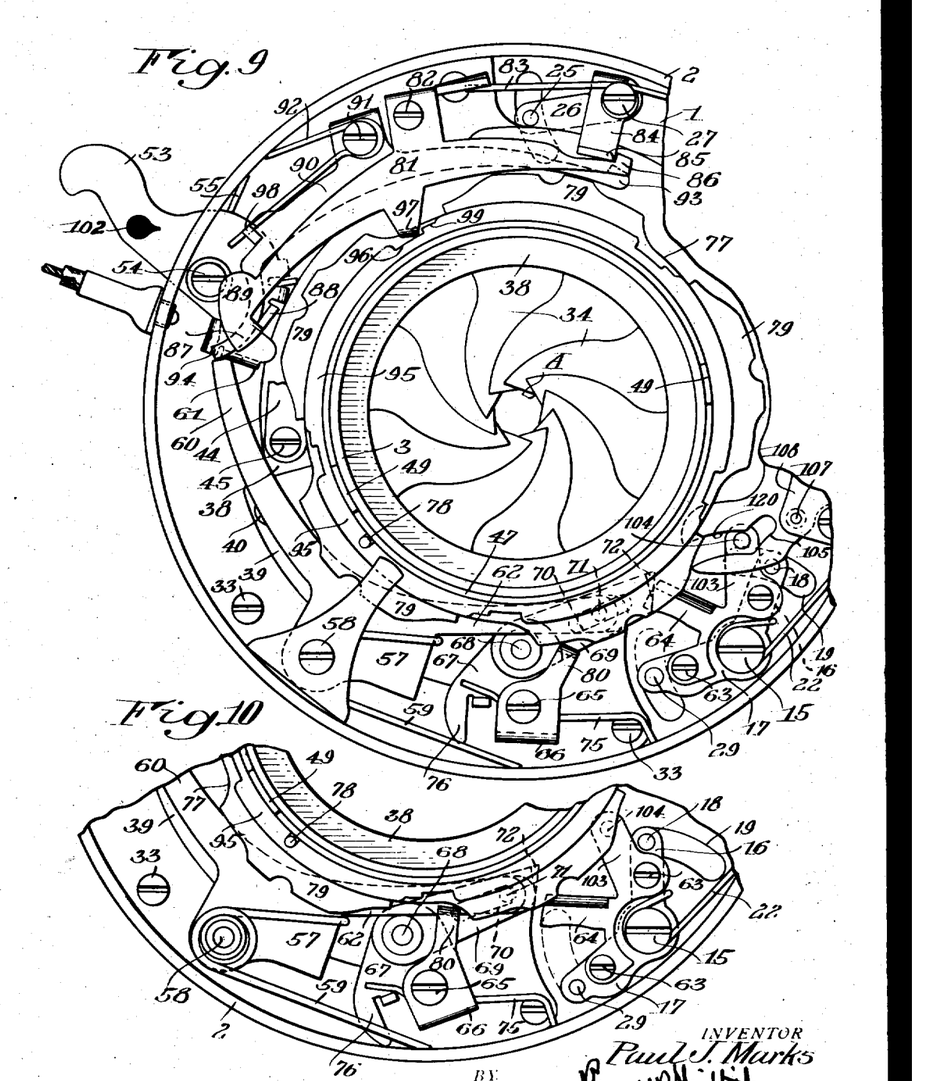
Fig. 9 is a similar view with the shutter blades open.
Fig. 10 is a fragmentary showing of certain parts shown in Fig. 9 but in different positions.
Figures 14, 15:
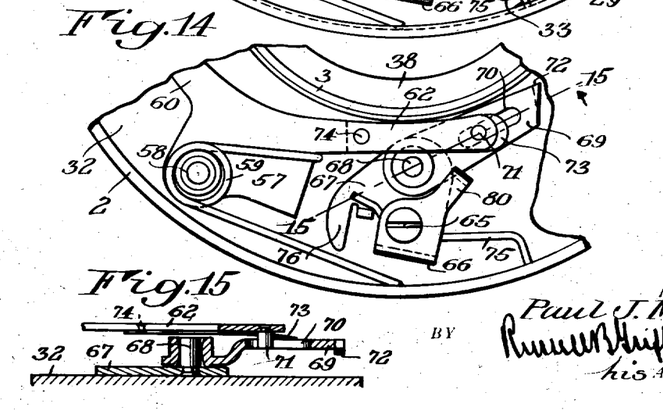
Fig. 14 is a fragmentary detailed view of parts shown in Fig. 13 in another position.
Fig. 15 is a detailed sectional view taken substantially on the line 15—15 of Fig. 14.

The opposite or actuating arm of the master member 57 is indicated at 62 and is best shown in full lines in Fig. 14. Referring back now to the blade actuating lever 16—17, there is secured thereto by screws 63 a bevelled radial arm 64. Pivoted adjacent thereto at 65 is a yoke 66, a bottom arm 67 on which (see also Fig. 12) carries a stud 68 and pivoted on this stud is an arm 69 (Fig. 15) which is provided with a longitudinal slot 70. A pin 71 on the actuating arm 62 of the master lever rides in this slot to rock the arm. At the tip of the latter is a cam shoulder 72 that cooperates with bevelled actuator arm 64 of the blade mechanism. The yoke 66 does not move except for purposes of adjustment, as hereinafter described, and takes no part in the opening and closing of the blades for an exposure, which action is as follows:

The normal position of the parts with the blades closed, under the influence of spring 22, is shown for instance in Figs. 8 and 10. When the arm 62 of the master lever is drawn back to set position against main spring 59, it rocks lever 69 on yoke arm 67 to the right through the slot and pin connection, so that shoulder 72 rides over the bevelled portion of lever 64 and sets to engage behind it. When the master member is released by the operating member, its spring returns lever 69, the shoulder 72 riding along the rear edge of lever 64 and rocking it and the blade actuator, to which it is connected, to the right opening the blades. The shoulder ultimately slips off the end of lever 64, whereupon the spring 22 instantly closes the blades again.

It will be seen from Figs. 14 and 15 that a leaf spring 73 is secured to the underside of arm 69 at 74. The pin 71 on the tip of the master member extends freely through a hole in this spring to reach the slot 70 and the spring bears upon the top of lever 69. The purpose of this is to provide resiliency in the contact of shoulder 72 with actuator arm 64 in the setting movement and to further this end arm 69 has a slightly tilting bearing upon its mounting stud 68.

The duration of a given exposure, it is plain, will depend upon the mechanical advantages or disadvantages with which the master lever operates upon intermediate arm 69 and the latter in turn operates upon arm 64. If shoulder 72 engages arm 64 relatively close to the center 15 of the latter, it will dwell upon it for a long time before it finally slips off, holding the shutter blades open for a correspondingly longer period and it will furthermore act at a mechanical disadvantage, whereas if the shoulder just engages the tip of the arm, it will work at mechanical advantage and instantly snap off, giving a very short instantaneous exposure. Such adjustments are provided for by the pivotal mounting at 68 of the arm 69 on the yoke arm 67 which may be swung back and forth to carry center 68 closer to or farther from center 15, at the same time shortening or lenthening the distance between center 68 and the point of engagement of the master lever at 71 with lever 69. In Fig. 10, yoke arm 67 is held by a yoke spring 75 in an extreme position of adjustment to the left for an instantaneous exposure of the shortest duration, said arm being stopped by a finger 76 thereon engaging the wall of the case. In Fig. 14, on the other hand, the opposite extreme is shown, as is also the case in Fig. 13. In other words, ordinarily and in common shutter construction of this type, the shoulder 72 that engages actuator arm 64 would be on the master lever itself and the reason for the provision of the intermediate lever 69 is to produce the same result with what corresponds to a lengthening or shortening of the master lever. These adjustments of such intermediate lever 69 by swinging the yoke 66 and changing the positions of the lever's pivot carried thereby are accomplished in the following manner:

Referring more particularly to Figs. 9 to 12, the cam ring 47 is provided just above cam 48 for the diaphragm with an overlying cam 77 secured thereto by pins 78. It has a plurality of groups of cam combinations 79 which are repeated throughout its circumference and are identical with each other. There are five in the present instance in all and each corresponds and coincides with one of the groups B—C, C—D, et cetera of cam tracks on diaphragm cam 48. On yoke 66 is an upper arm 80 in the plane of this cam 77 and held against the same by yoke spring 75. As the cam is turned by the setting dial, the arm 80 rides thereon and effects the necessary adjustment from the position of Fig. 10, which has before been described as the shortest instantaneous exposure, to the position of Fig. 13 for the longest automatically timed exposure of one second, in the present case.

Nor does this affect provisions for time and bulb exposures which are also furnished and which will now be described. Fig. 8 shows the adjustment for time exposure with the shutter blades closed and Fig. 9 the position for time exposure with the shutter blades open between manipulations of the operating lever 53. It will be seen that arm 80 is on a certain neutral portion of one of the cam groups 79 of the blade cam in both of these views.

The time lever is indicated at 81 and turns on the fixed pivot 82. A spring 83 mounted on stud 27 of the blade mechanism tends to swing this time lever in a counter-clockwise direction or to the left in the figures. Briefly referring back to Fig. 4, it will be recalled that arm 26 on this same stud 27 moves with the blade or exposure mechanism. Integral therewith and swinging on the same center is an overlying arm 84 having an upstanding shoulder 85 thereon. When the shutter blades open, this arm 84 swings clockwise from the position of Figs. 4 and 8 to that of Fig. 9. When the shutter is set for a time exposure, this shoulder 85 engages with a detent 86 on one arm of the time lever 81 by reason of the fact that a stop 87 on the opposite arm of the time lever is released from a finger 88 on the inner arm of the operating lever 53 as the latter is depressed, which stop is normally held by the finger 88, as in Fig. 8. In other words, the finger 88 passes from the position of Fig. 8 to that of Fig. 9. This is on the first operation of operating lever 53 for a time exposure. When the next operation of the operating lever 53, after the shutter blades have been held open the desired time by the time lever detent 86, occurs, finger 88 of the operating lever slips off of stop 87, by which it has itself been detained through engagement with shoulder 89 thereon, as in Fig. 9, and engages the time lever on that arm thereof to rock detent 86 on the opposite arm out of engagement with shoulder 85 on blade lever 84 and the blades close in the manner described in connection with the explanation of the blade mechanism.

As is well understood in the art, a time exposure is effected by two depressions of the operating lever 53, upon one of which it first moves from the position of Fig. 8 to that of Fig. 9 in which it is detained by shoulder 89 on the time lever 81 and upon the other of which it returns to its full normal position of Fig. 8, while on a bulb exposure the operating lever is depressed to open the blades and held depressed for the desired period, during which they are to be maintained open, the blades closing upon the release and return of the operating lever. This is effected, in the present instance, as usual through the provision of a bulb stop lever 90 underlying the time stop lever 81 and pivoted upon a fixed stud 91, about which is coiled a spring 92 tending to swing it in a counter-clockwise direction. This bulb stop lever also has a detent 93 adjacent to the time stop detent 86 that is thrown into engagement with blade mechanism shoulder 85 when the blades are open by its said spring. Normally, finger 88 on the operating lever engages a curved tail 94 on the opposite arm of this bulb stop lever and holds its said detent out of engagement, as in Fig. 8. When, however, the operating lever is depressed, it rides off of this tail piece as it opens the blades, permitting the detent engagement and when the operating lever is released again, shoulder 85 is released by the detent and the blades immediately close.

This bulb lever is really part of the time exposure mechanism, because it detains shoulder 85 during the time that the finger 88 on the operating lever after the depression of the latter for the first time is returning to engagement with stop shoulder 89, the subsequent depression of the operating lever releasing both detents. When the bulb lever 90 is working alone, however, for bulb exposure, its detent alone engages the blade shoulder and then disengages from it as soon as it is released.

The action of the bulb lever is practically the same under all conditions, because on a bulb exposure the blade mechanism is either caught and released thereby for closing movement of the blades or is caught and released thereby only to be caught by the time lever detent before the blades can close without releasing the latter. But with an instantaneous or automatically timed exposure, both levers must be thrown out of operation. This is accomplished in the following manner:

Another cam ring 95 (Fig. 11) encircles the ring 47 and is superposed upon blade cam 77, being secured thereto by the same pin 78. To agree with the cam arrangements heretofore described, it presents a concentric peripheral surface except for five notches 96, one for each cam group 79 of the blade cam and correspondingly for each group B—C, et cetera, of the diaphragm cam. A projection 97 on time lever 81 normally rides on the concentric portion to hold the time lever so that detent 86 cannot engage. In such instances, the time lever engages an interlocking finger 98 on the bulb lever to maintain it inoperative also. When, however, the adjustment of the dial 4 is properly made, projection 97 falls into notch 96 and is afforded sufficient clearance to allow operation of both the time and the bulb levers and accomplish a time exposure. A further slight adjustment of the dial and cams (turning always to the left carries notch 96 away from projection 97 and opposite a shallower adjoining notch 99. This still holds time lever 81 out of operation but causes it to fail to rise sufficiently to throw bulb lever 90 out of operation by engagement with finger 98 and a bulb exposure results.

Enough has now been described to permit explanation of the manner in which the dial 4 may be set by either skilled or unskilled photographers to obtain the best results under a given condition taking into account and coordinating the general weather or light conditions, the background or surroundings, the distance of the object in general, and the condition of the object as, for instance, whether it is stationary, moving slowly, or moving rapidly. Corresponding to the controlling cams described for the diaphragm opening, the shutter speeds and the time and bulb stops, the dial 4 is divided into five sectors 100$^a$, 100$^b$, 100$^c$, 100$^d$, and 100$^e$. Each provides for a different kind of view as to distance or background, as will be clearly understood from Fig. 1 without the use of further reference numerals. Each sector is further individually sub-divided for conditions of light volume, as shown, into "Dull", "Clear" and "Bright", there being time and bulb stops for each sector. Different shutter speed indications, ranging in the present instance from a hundredth of a second through to one second, automatically timed by the speed control mechanism, are appropriately disposed through indications 101 in conjunction with these other designations and may be brought into register with an indicator 102 which, for convenience in the present instance, is placed upon the operating lever 53. Thus, the full range of shutter speeds is provided in each sector to cover five conditions under which any one of them may appropriately be used with an accompanying adjustment of the diaphragm that is also appropriate.

In addition to the means embodied in the adjustment of the master lever and its intermediate lever 69 with reference to contact with lever 64 of the blade actuating mechanism to change the duration of the exposure as heretofore described, I employ a retarding mechanism connected with the blade actuating mechanism, the adjustment of which further times the period between a complete opening and the start of the closing of the blades. It is common practice in the art to term an exposure automatically timed in this general manner as an "instantaneous" exposure, whether the duration thereof is a hundredth of a second or one second (in the range of the present shutter) to distinguish it from the time and bulb exposures, the mechanisms of which have been described. My description is based on this understanding.

Figure 13:
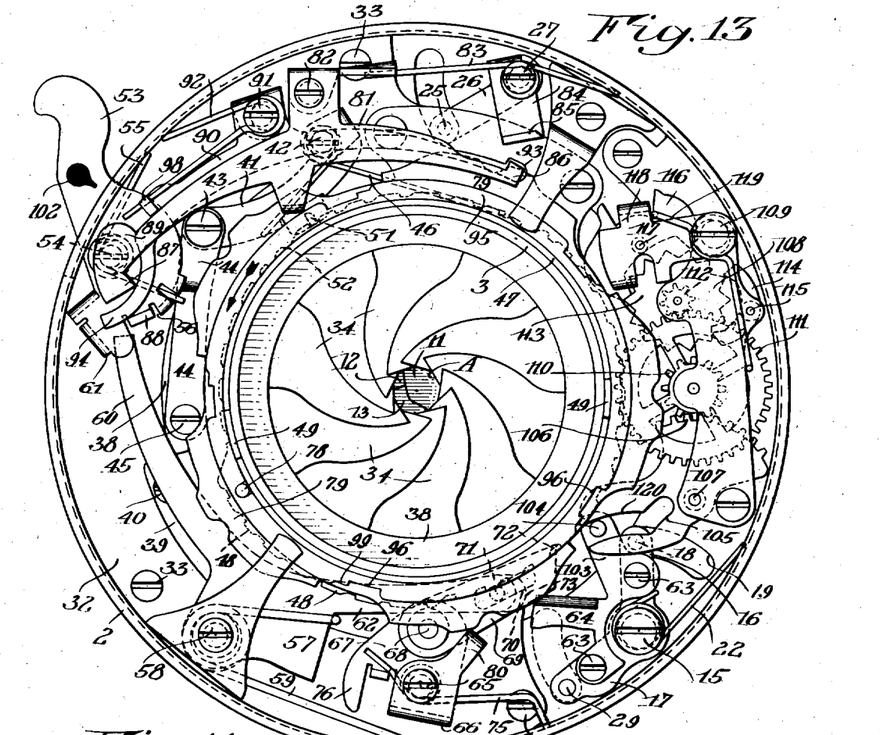
Fig. 13 is a view similar to Figs. 8 and 9, showing the parts adjusted for an automatically timed maximum exposure of one second.

In providing for these instantaneous exposures, so further timed by the retarding mechanism about to be described, it is desirable that the shutter blades 11—12—13 open with the greatest rapidity to their full extent and, after the timing, close with similar rapidity, the timing mechanism or retard exerting its influence only between these acts. The present provisions for accomplishing this with a novel retarding mechanism per se, in the present shutter, are as follows:

Referring more particularly to Figs. 8, 9 and 13, the actuating arm 64 of the blade mechanism secured by the screws 63 has an integral extension 103 provided with an upstanding pin 104, the normal position of which, when the shutter blades are closed, is that of Figs. 8 and 13. This pin 104 cooperates with a slot or bifurcation 105 in a swinging toothed segment 106 pivoted at 107. This pivot 107 extends between the fixed partition member 32 and a bridge piece 108 spaced therefrom on posts 109, which bridge piece similarly confines all of the retarding elements now being described. The said segment 106, through meshing with a pinion 110, is adapted to drive a train of gearing including a gear 111 fixed to the pinion 110 and meshing with a pinion 112 on a star escapement wheel 113. Cooperating with this star wheel 113 in the usual manner is an 7 oscillating anchor 114 having a pivot 115 that is fixed and another oscillating anchor 116 mounted on a pivot 117 carried by a yoke 118 pivoted upon one of the posts 109 and actuated by a spring 119 to normally hold it in engagement.

It will be seen from this that oscillations of the segment 106 carry the burden of the resistance of the aforesaid gearing. Referring to Figs. 8 and 13, first, the portion 120 of the slot 105 therein is concentric with the center 15 of pin 104 as to its swinging movement. Starting from the normal position of Fig. 8, pin 104 will, therefore, traverse this portion of the slot without actuating segment 106. It is at this time that the shutter blades are open and, therefore, the quick unimpeded opening movement that is desired is effected. Upon reaching the end of the arcuate portion 120, the pin 104 rocks the segment and it is there that the timing of the opening is effected. Because of the shape of the slot 105, pin 104 will swing the segment first in one direction and then in the other, so that the retarding action is repeated or doubled during a single exposure. In this way a relatively small train of retarding gearing may be employed and still afford a wide range of timing.

When pin 104 returns to the segmental portion 120 on the segment slot, the master lever has slipped off of the actuator arm 64 and the segment is thereafter unmoved by the pin 104 and the blades are permitted to close under their own spring with the same rapidity with which they opened. Furthermore, the retarding mechanism is not thrown out entirely during bulb and time exposures as is ordinarily done in shutters of this type. This becomes unnecessary because of the arcuate lost motion stop 120 but as the blades open on a time exposure, the function of the retarding mechanism is to relieve the shock.

I further provide for adjusting or varying the resistance of the retarding gearing. As previously described, the anchor 116 is carried on pivoted yoke 118. This yoke is in the path of and actuated by the same cam 77 that adjusts the position of the intermediate lever mounting 66 of the blade actuating mechanism. In other words, it is controlled in the same manner as the arm 80 that changes the adjustment of the actuating mechanism through this same cam 77. Therefore, when arm 80 is adjusted for a certain speed by contact with one cam group 79, yoke 118 is correspondingly adjusted by another cam group on the same ring to be thrown in or out of cooperation with star wheel 113, as the case may be. For instance, in the positions of Fig. 13 where the shutter is set for the longest automatically timed exposure of one second, the maximum resistance all through the chain is required, so it will be seen that the master lever is ready to engage actuating arm 64 to its greatest mechanical disadvantage and anchor 116 is in gear.

I claim as my invention:

1. In a photographic shutter, the combination with a casing and an iris diaphragm mechanism, a shutter mechanism and a timing device for the latter mounted therein, of a unitary control for concomitantly adjusting the diaphragm opening and the timing device for consonant action in producing a photographic effect, the same comprising a dial constituting a cover for the casing.

2. In a photographic shutter, the combination with a casing and an iris diaphragm mechanism, a shutter mechanism and a timing device for the latter mounted therein, of a unitary control for concomitantly adjusting the diaphragm opening and the timing device for correlated action in producing a specific photographic effect, the same comprising a dial constituting a cover for the casing and movable successively in one direction to effect different adjustments.

3. In a photographic shutter, the combination with an annular casing embodying a lens tube collar, an iris diaphragm mechanism, a shutter mechanism, and a timing device for the latter mounted therein, of a unitary control for concomitantly adjusting the diaphragm opening and the timing device for consonant action in producing a photographic effect, the same comprising a dial rotatable upon the lens tube collar.

4. In a photographic shutter, the combination with an annular casing embodying a lens tube collar, an iris diaphragm mechanism, a shutter mechanism, and a timing device for the latter mounted therein, of a unitary control for concomitantly adjusting the diaphragm opening and the timing device for consonant action in producing a photographic effect, the same comprising a dial rotatable upon the lens tube collar and carrying cam rings cooperating with the iris diaphragm mechanism and the timing device, respectively.

5. In a photographic shutter, the combination with a casing and an iris diaphragm mechanism, a shutter mechanism and a timing device for the latter mounted therein, of a unitary control for concomitantly adjusting the diaphragm opening and the timing device for consonant action in producing a photographic effect, the same comprising a dial constituting a rotatable cover for the casing and bearing indicia indicative of light conditions.

6. In a photographic shutter, the combination with a casing and an iris diaphragm mechanism, a shutter mechanism and a timing device for the latter mounted therein, of a unitary control for concomitantly adjusting the diaphragm opening and the timing device for consonant action in producing a photographic effect, the same comprising a dial constituting a rotatable cover for the casing and bearing indicia indicative of the condition of the object.

7. In a photographic shutter, the combination with a casing and an iris diaphragm mechanism, a shutter mechanism and a timing device for the latter mounted therein, of a unitary control for concomitantly adjusting the diaphragm opening and the timing device for consonant action in producing a photographic effect, the same comprising a dial constituting a rotatable cover for the casing and bearing indicia indicative of light conditions and the condition of the object.

8. In a photographic shutter, the combination with a casing, a blade mechanism and a diaphragm mechanism therein, said casing embodying a collar defining the lens opening, of cam mechanism rotatable on said collar for concomitantly adjusting the blade mechanism and the diaphragm mechanism.

9. In a photographic shutter, the combination with a casing and an iris diaphragm and shutter blade mechanism therein, of a dial rotatable on the casing, a cam operated thereby for successively changing the opening in the diaphragm, and another cam movable with the first one having repeated thereon groups of cam surfaces controlling the shutter blade mechanism, each said group corresponding to a certain adjustment of the diaphragm cam.

10. In a photographic shutter, the combination with a casing and an iris diaphragm and shutter blade mechanism therein, of a dial rotatable on the casing and carrying notations of light conditions and shutter speed designations, a cam operated thereby for successively changing the opening in the diaphragm, and another cam movable with the first one having repeated thereon groups of cam surfaces controlling the shutter blade mechanism, each said group corresponding to a certain adjustment of the diaphragm cam.

11. In a photographic shutter, the combination with a casing and an iris diaphragm and shutter blade mechanism therein, the latter embodying time and bulb stops, of a unitary rotary cam element on the casing having separate cam tracks for respectively controlling the diaphragm, the blade mechanism and the time and bulb stops.

12. In a photographic shutter, the combination with a casing and an iris diaphragm and shutter blade mechanism therein, the latter embodying time and bulb stops, of a unitary rotary cam element on the casing having separate cam tracks for respectively controlling the diaphragm, the blade mechanism and the time and bulb stops, and a rotatable dial on the casing having a plurality of groups of notations indicative of light conditions and sub-divided into shutter speed designations, said dial being connected to the cam element.

13. In a photographic shutter, the combination with a casing and diaphragm and shutter blade mechanisms therein, the latter embodying an actuating element for opening the blades, of a master member cooperating with the actuator, and means for changing the mechanical advantage with which it acts thereon, said means also being connected to consonantly adjust the diaphragm.

14. In a photographic shutter, the combination with a casing and shutter blade mechanism therein embodying an actuating element for opening the blades, of a master member and an intermediate member, the intermediate member being adapted to engage the actuating member and the master member being adapted to operate the intermediate member, and means for varying the position of the latter to change the mechanical advantage with which the power of the master member is communicated to the actuating member.

15. In a photographic shutter, the combination with a casing and shutter blade mechanism therein embodying an actuating element for opening the blades, of a master member and an intermediate member, the intermediate member being pivoted to the casing and adapted to engage the actuating member and the master member being adapted to operate the intermediate member, and means for shifting the intermediate member upon its pivot for varying the position of the latter to change the mechanical advantage with which the power of the master member is communicated to the actuating member.

16. In a photographic shutter, the combination with a casing and shutter blade mechanism therein embodying a swinging actuating element for opening the blades, of a master member and an intermediate member, the intermediate member being pivoted to the casing and having a slip-off connection with the actuating member and the master member having a sliding engagement with the intermediate member, and means for shifting the intermediate member upon its pivot to vary the position thereof and to change the mechanical advantage with which the power of the master member is communicated to the actuating member.

17. In a photographic shutter, the combination with a casing and shutter blade mechanism therein embodying a swinging actuating element for opening the blades, of a master member arranged to communicate motion to the actuating member, a retarding device embodying gearing, and connections between the actuating element and the retarding device whereby motion is communicated to the latter in two directions during one exposing movement of the blades.

18. In a photographic shutter, the combination with a casing and shutter blade mechanism therein embodying a swinging actuating element for opening the blades, of a master member arranged to communicate motion to the actuating member, and a retarding device embodying gearing including a swinging segment arranged to be engaged by the actuating member and to be operated thereby in two directions after an idle movement of the latter during which the blades are opened.

19. In a photographic shutter, the combination with a casing and shutter blade mechanism enclosed therein embodying a plurality of symmetrically opening blades pivoted to the casing and having angular slots therein, of actuating mechanism for the blades embodying a yoke having an oscillating movement and provided with pins cooperating with the slots to first quickly open the blades and then move idly with reference thereto, and a retarding device arranged to act upon the actuating mechanism during such idle movement.

20. In a photographic shutter, the combination with a casing and an iris diaphragm mechanism, a shutter mechanism and a timing device for the latter mounted therein, of a unitary actuating control movable successively in one direction for concomitantly adjusting both the diaphragm opening and the timing device for repeated correlated actions in producing different photographic effects.

PAUL J. MARKS.